Sept. 18, 1956 M. J. CARRAU 2,763,447
HIGH ALTITUDE OBSERVATION MEANS
Filed Aug. 10, 1954 4 Sheets-Sheet 1
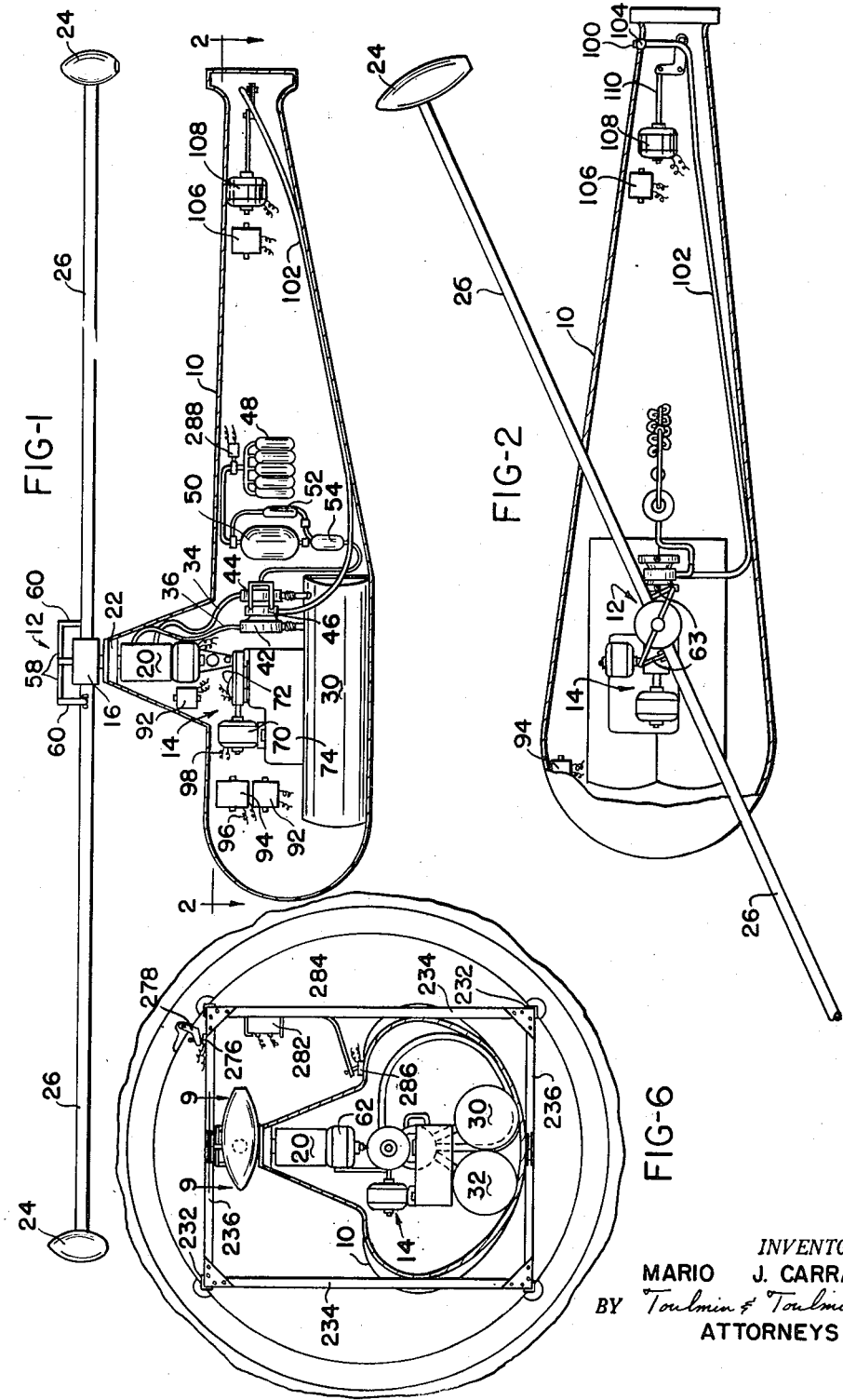
INVENTOR.
MARIO J. CARRAU
BY Toulmin & Toulmin
ATTORNEYS

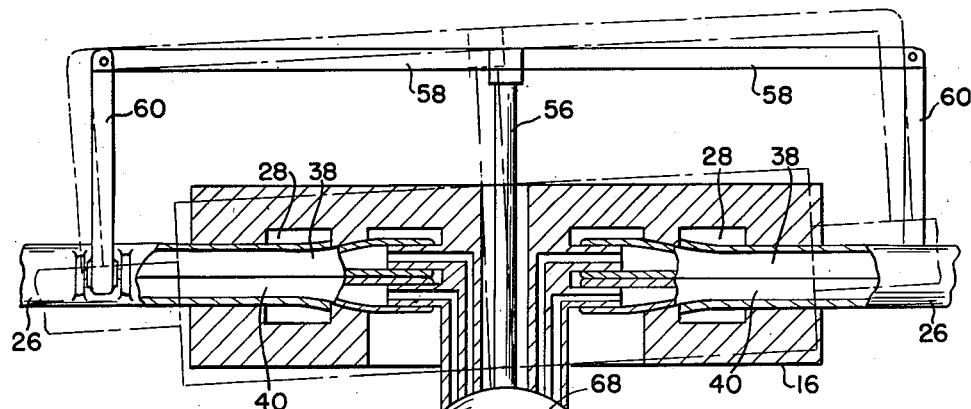
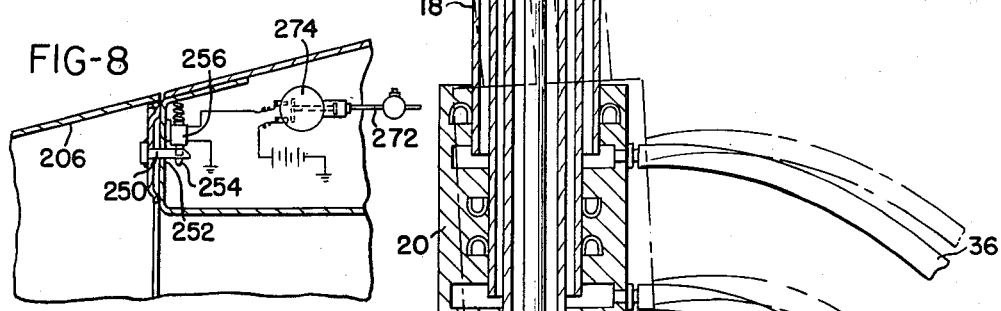
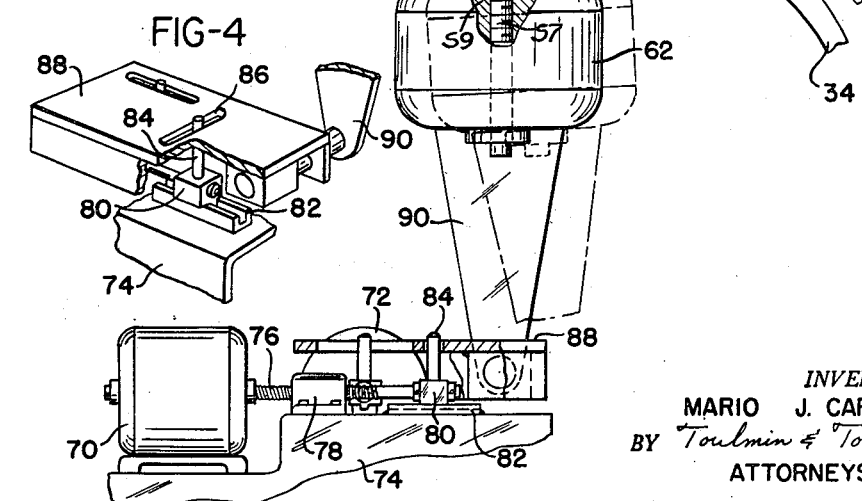

Sept. 18, 1956 M. J. CARRAU 2,763,447
HIGH ALTITUDE OBSERVATION MEANS
Filed Aug. 10, 1954 4 Sheets-Sheet 3
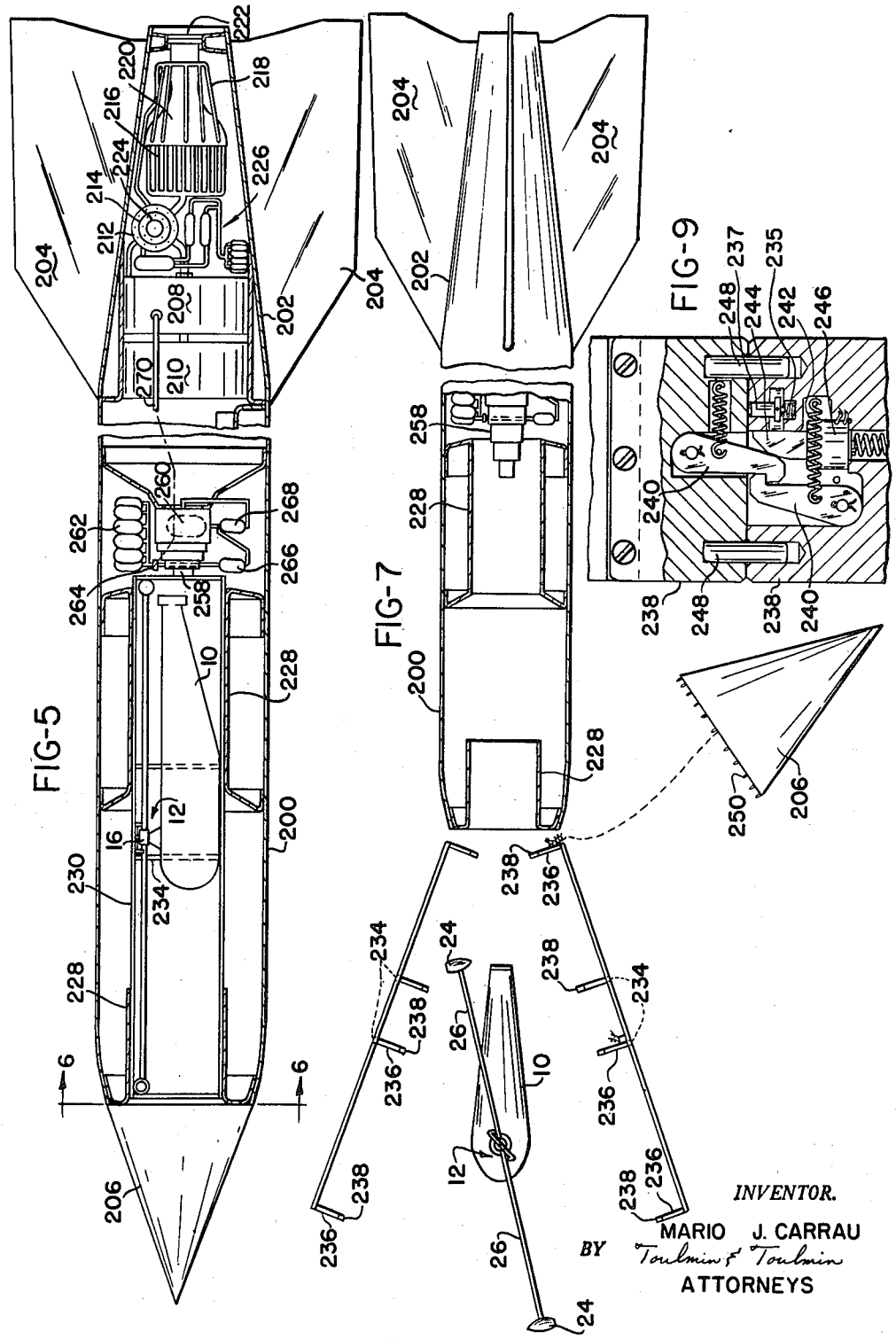
INVENTOR.
MARIO J. CARRAU
BY Toulmin & Toulmin
ATTORNEYS Sept. 18, 1956 M. J. CARRAU 2,763,447
HIGH ALTITUDE OBSERVATION MEANS
Filed Aug. 10, 1954 4 Sheets-Sheet 4

INVENTOR.
MARIO J. CARRAU
BY Toulmin & Toulmin
ATTORNEYS

United States Patent Office 2,763,447
Patented Sept. 18, 1956

2,763,447
HIGH ALTITUDE OBSERVATION MEANS
Mario J. Carrau, Los Angeles, Calif.

Application August 10, 1954, Serial No. 448,940

6 Claims. (Cl. 244—2)

This invention relates to the collection of scientific data at high altitude. More particularly, it is well known that with the endeavor to improve high altitude flying and to guide missiles in the stratosphere, and possibly beyond the same, there arises the problem of providing means for collecting scientific data at such high altitudes. Such data is used for solving the problem of guiding missiles at such altitudes and to aid in eventually overcoming space.

It is, therefore, an object of the present invention to provide a method of and means for making it possible to observe and register conditions in the stratosphere.

It is also an object of this invention to provide means with which to reach the stratosphere and which may be used for guiding missiles at such high altitude.

It is a further object of this invention to provide means which can be launched from the ground and will eventually be able to overcome gravity.

It is a still further object of this invention to provide a space helicopter which will be adapted to act in the manner of satellites, and will be able to replace orbital rockets.

It is still a further object in this invention to provide a space helicopter which could be used for interplanetary travel, for instance, to land on the moon and on the earth and to take off therefrom.

A more specific object of this invention is the provision of a helicopter which can be launched from the ground within a rocket, and which, after reaching the desired altitude, can be ejected from the rocket, thereafter existing in the atmosphere or outer space under its own power.

These and other objects and advantages of the invention will appear more clearly in the following specification taken in connection with the accompanying drawings, in which:

Figure 1 illustrates a vertical cross-sectional view of the helicopter alone;

Figure 2 shows a top plan view of the helicopter having a portion thereof cut away;

Figure 3 is a vertical sectional view of a portion of the helicopter shown in Figures 1 and 2 and particularly illustrating the helicopter rotor control means;

Figure 4 is a partial detail view of a portion of Figure 3 showing in particular the operation of the rotor control;

Figure 5 is a longitudinal sectional view of the rocket showing the helicopter housed therein;

Figure 6 is a cross-sectional view taken along the lines 6—6 of Figure 5;

Figure 7 is a cross-sectional view of the rocket and helicopter and is intended to show the relationship of the various parts immediately after the helicopter has been expelled from the rocket;

Figure 8 is a partial cross-sectional view of the rocket of Figure 5 and in particular shows a means for separating the warhead from the rocket body upon the release of the helicopter;

Figure 9 is a partial section indicated by lines 9—9 on Figure 6 illustrating means for locking frame members, which houses helicopter, therein; and in particular shows means for separating frame members after helicopter has been ejected from within the rocket;

General arrangement

Figure 11:
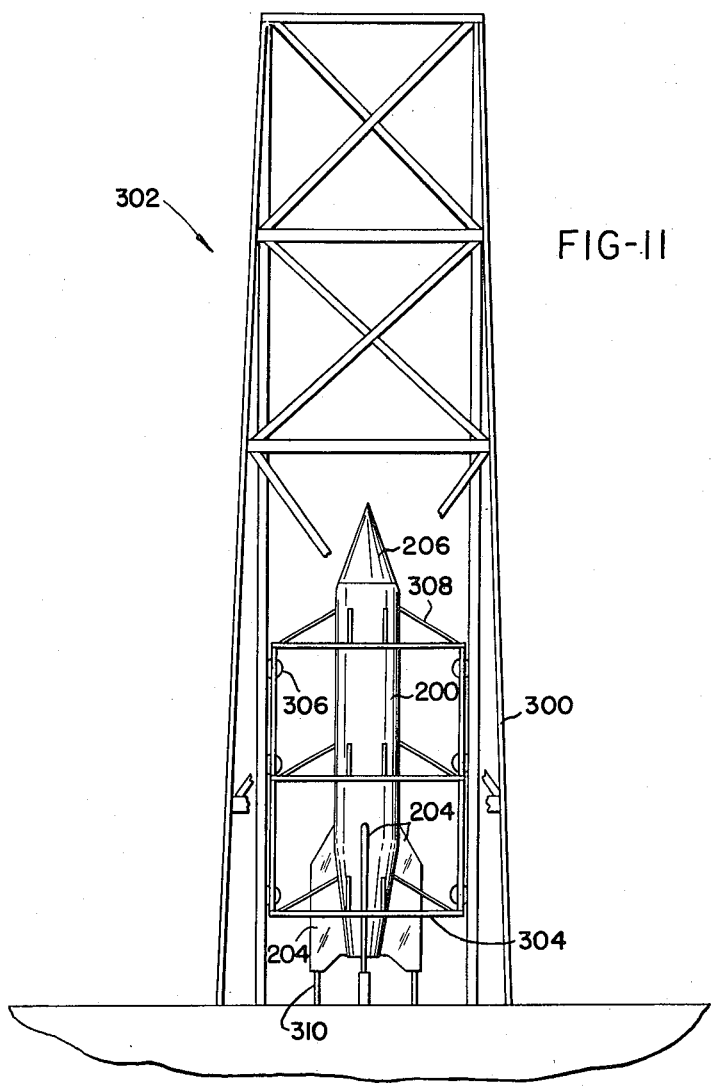
Figure 11 shows one means of launching rocket.

Rocket vehicles or projectors developed so far have the disadvantage that their speed cannot be reduced to such an extent that they will stay at high altitude for even a limited short time during which they could be used for observation purposes, high altitude reasearch or the like. On the other hand, helicopters, as presently available, are not adapted to reach high altitudes.

The above disadvantages have been overcome according to the present invention by combining a rocket with a helicopter. More specifically, the rotor of a helicopter is provided with jet propulsion means which are adjustable relative to the plane in which the rotor turns. Furthermore, the thus equipped helicopter is enclosed in a rocket adapted at a predetermined height to free the helicopter, which, through its jet propulsion means, continues to operate and to sustain itself in air or space by its own rotor. However, if desired, it is not necessary to launch the helicopter in a rocket according to the present invention, but the helicopter may be operated for taking-off and landing purposes by other means such as a jet engine. It will be understood that by utilizing a suitable pitch changing mechanism for a helicopter rotor, the helicopter could be made to take off without the assistance of a jet engine or rocket.

Structural arrangement

Referring now to the drawings in detail, and to Figures 1 to 3 thereof in particular, the structure shown therein comprises a first embodiment of the present invention. As will be seen from the drawings, the helicopter shown in these figures resembles in general, a normal helicopter having a fuselage 10, a rotor 12 and driving means generally indicated by the numeral 14 for actuating the rotor.

Referring now more specifically to the drive means 14, best illustrated in Figure 3, it will be noted that there has been provided a rotor hub 16 having a rotor shaft 18, the latter being rotatably supported in the bearing housing 20. The rotor shaft 18 is also supported against lateral movement in the fuselage of the helicopter as indicated in Figure 3 at 22. In contrast to the normal helicopter, the rotor 12 of the helicopter is rotated by means of jet propulsion units 24 mounted at the outer extremities of the rotor spokes 26. The individual structures of these jet propulsion units may be of standard construction such as shown in U. S. Patent No. 2,472,917 and are securely or rigidly mounted to the spokes or tubes 26, the latter being rotatable with the hub 16 and shaft 18. Furthermore, the rotor spokes 26 are journalled in rocking hinges as 28, within the rotor hub 16 thus permitting a twisting or rotating of the spokes or tubes and attached jet units relative to hub 16. Fuel is supplied from tanks 30 and 32 located in the fuselage of the helicopter and fuel lines 34 and 36 lead from these tanks into the bearing housing 20 and thence through the respective concentric tubes to the rotor hub 16. From there fuel is fed through tubes 38 and 40 located within tubes 26 to the respective combustion chambers (not shown) of the jet propulsion units 24.

The fuel system utilized in this invention employs a liquid propellant such as hydrogen peroxide and an oxydiser or catalyst such as calcium or sodium permanganate, manganese dioxide, potassium permanganate etc. The hydrogen peroxide acts as a mono-propellant and when it is mixed with one of the named catalysts, produces superheated steam under high pressure. Such a fuel system is disclosed in Patent No. 2,610,607 and obviates the need for igniters and complex starting arrangements.

Referring to Figure 1, tank 30 is supplied with the catalyst solution and tank 32 with a solution of hydrogen peroxide. Each of these tanks is equipped with a centrifugal pump, 42 and 44 for forcing the respective liquid into the combustion chamber of the jet units. A turbine 46 coupled to each of the shafts of the pumps is used for driving the same.

The turbine 46, in turn, is driven by another hydrogen peroxide-permanganate system as follows. The fuselage of the helicopter houses a number of bottles 48 carrying nitrogen under high pressure. Tanks 50 and 52, respectively are supplied with solutions of hydrogen peroxide and a catalyst, such as sodium permangante (or one of the other solutions mentioned above) and tank 54 acts as a reaction chamber. Suitable lines are connected between these tanks and turbine 46 so that when the pressurized nitrogen is released, mixing of the peroxide and permanganate solutions will occur in chamber 54, producing superheated steam under pressure which in turn will drive turbine 44. Control of nitrogen pressure will be discussed in greater detail subsequently.

Referring again more particularly to Figure 3, the jet propulsion units 24 are preferably arranged so that the angle of the longitudinal axes thereof can be varied with regard to the plane in which the rotor rotates. The angular adjustment of the jet propulsion units can be effected in several ways but as herein disclosed, a collective pitch control means is provided. Thus a pitch control rod 56 is mounted centrally of the rotor hub 16 and extends downwardly through the rotor shaft and bearing housing. The upper end of rod 56 is connected to a transverse bar or bolster 58 which, in turn, is pivotally connected at each outer end to a dependent pitch arm 60. These pitch arms are further pivotally attached to the adjacent rotor spoke 26 by means of levers 63, best seen in Figure 2. Since the jet units are rigidly attached to the outer ends of the rotor spokes 26, it is believed clear that upon upward or downward movement of pitch control rod 56, the angle of the longitudinal axis of each jet unit can be varied. Furthermore, since pitch arms 60 are connected on opposite sides of the rotor spokes, rotation of the jet units will be in opposite directions, thereby achieving the desired variation in the angle of the jets. Inasmuch as an increase or decrease in collective pitch increases or decreases the power requirements, a linkage (not shown) is provided so that the throttle is controlled in a manner to provide the proper changes in the power of the helicopter propulsive units 24.

The collective pitch control rod 56 is moved up and down through the actions of servo-motor 62. As shown the lower end of rod 56 is provided with a threaded shank 57 which is threadedly received in the hollow threaded rotor 59 of servo-motor 62. When the rotor or armature turns it acts as a nut, causing rod 56 to move up or down.

Figure 10:
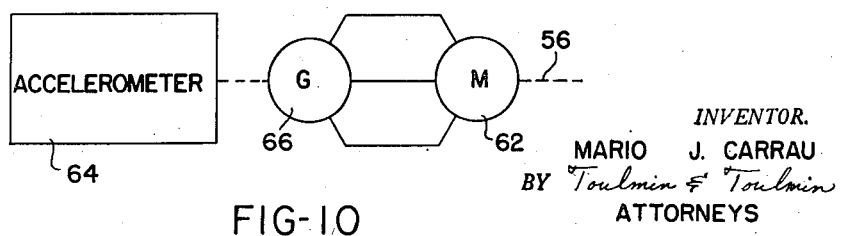
Figure 10 illustrates diagrammatically one method of controlling helicopter pitch control rod while in flight.

For high altitude research, i. e., in those instances when the helicopter is launched from the rocket at high altitudes, it is not contemplated that the helicopter be under the control of a human pilot. Thus automatic control must be provided. Radio or remote control could be utilized but in the preferred embodiment, schematically shown in Figure 10, an accelerometer 64 is used to control the changes in pitch through a servo-system. The rotatable element of the accelerometer 64 is connected to the rotor of a servo-generator 66, the stator field of the latter feeding into the stator field of servo-motor 62, seen also in Figure 3. Thus rotation of the armature of servo-motor 62 will be proportional to the acceleration of the helicopter. Thus if the helicopter attempts to descend, the rotation of the accelerometer will be translated by the servo system into the proper rotation of rod 56 to increase the pitch of the rotor to produce more lift; if the helicopter attempts to ascend, the reverse action will occur. Only when the accelerometer is at rest will the pitch remain constant. This particular or normal pitch angle will be predetermined depending on various factors, such as helicopter weight, rotor speed, desired altitude etc., or depending on what it is desired the helicopter should do, such as remain aloft as long as the fuel lasts, descend gradually etc.

The horizontal flight and general balance of the helicopter is controlled by tilting of hub 16 and may be governed by gyroscopic controls, a pilot or remote control. However, as mentioned in relation to the mechanism for changing the rotor pitch, a piloted helicopter is not contemplated in the illustrated embodiment and although radio or remote control could be employed a pre-set completely automatic gyroscopic arrangement is preferred.

Thus tilting of the hub 16 takes place by the tilting of rotor shaft 18, with its accompanying appendage of concentric fuel tubes and bearing housing, around the swivel joint 68 mounted in the fuselage at 22. Longitudinal and lateral servo-motors 70 and 72 are rigidly mounted in any convenient manner to a portion 74 of the fuselage of the helicopter. These motors are mounted at right angles to each other and through mechanism to be presently described are adapted to move the rotor tubes 26 in vertical planes which lie at right angles to each other or through combined action, in an infinite number of vertical planes through 360°.

Both motors operate alike except with regard to the resultant direction of the force exerted by each so only one motor will be described in detail. Thus motor 70 is provided with a hollow threaded armature or rotor into which is threadedly received a threaded rod 76 which when the armature rotates, moves or screws in or out of the armature similar to the action of motor 62 and rod 56. Rod 76 extends through a guide means 78 and has attached thereto at one end a block 80, which is fitted to be slidably guided in rail or track 82. A vertical post 84 is rigidly attached to block 80 and extends upwardly through an elongated slot 86 in plate or table 88. The table or plate 88 is pivotally attached through some suitable connecting rod to a flange 90 which is rigidly secured to and depends from the bearing housing 20 or the housing of motor 62. It is believed evident therefore that movement of rod 76 will cause post 84 to move plate 88 which in turn will move flange 90 which will tilt hub 16 about joint 68. This latter movement is shown in dotted lines on Figure 3.

The other motor 72 is constructed and acts identically to motor 70 except that the resultant tilting of hub 16 or rotor spokes 26 would be in and out of the page when viewing Figure 3. Study of the construction of the tilting control unit in Figures 3 and 4 will show that plate 88 can be moved in a circular pattern by various combinations of movement between motors 70 and 72. Thus rotor hub 16 can be tilted in an infinite number of planes throughout 360°.

As mentioned above the preferred embodiment contemplates gyroscopic control for the horizontal flight control of the helicopter. Accordingly, a pair of gyroscopes 92 and 94 seen in Figure 1 are secured to the fuselage of the helicopter, one of the gyros 94 being for longitudinal or pitch control of the helicopter and one of the gyros 92 being used for lateral or control of the roll of the helicopter. Connections, as 96, are shown for connection to the stator field as 98 of the servomotors whereby electrical impulses from the gyroscopes are translated into rotation of the servo's rotor or armature. Though not illustrated, the electrical impulses are obtained from the gyroscopes in a conventional manner.

That is, each gyroscope is united to a small section that is fixed to move therewith and upon which press suitable carbon or copper brushes, the latter being secured to the fuselage of the helicopter. Every time the helicopter is removed from its position of balance, the brush will slide to the right or left of the sector, increasing or decreasing the voltage applied to the servo-generator. Assuming therefore, that prior to takeoff of the helicopter, the gyroscopes are set for balanced horizontal flight, then any force which tends to disturb this horizontal balance will cause the proper gyro to feed an impulse which through the mechanism described above will cause the hub to tilt and bring the helicopter back into the proper balance.

The helicopter is provided with one other control namely the directional or yaw control on the tail to offset the tendency of the fuselage to rotate with the rotor on account of the frictional drag therebetween. This is accomplished by changing the thrust of the anti-drag tail pipe control jet 100. The jet 100 is connected by pipe 102 to the exhaust of turbine 46 and the amount of thrust exerted by this jet is controlled by throttle 104. The amount that the throttle is opened or closed is controlled in turn by gyroscope 106 and servomotor 108 acting through the linkage system 110. Thus gyro 106 is preset to give the helicopter a predetermined course of flight and any deviation therefrom is corrected by the proper action of motor 108 screwing or unscrewing the rod of linkage system 110 much in the manner of motors 62 and 70 previously described to open or close throttle 104. It should be noted that in contradistinction to the conventional engine installation where the anti-torque thrust is applied in a direction similar to that of the rotor, in a jet propulsion helicopter, the anti-drag thrust is applied in a direction opposed to that of the rotor.

From the above it will be evident that the helicopter can be controlled in any direction whether it be in a horizontal or vertical direction or any combination thereof. Thus the helicopter of the present invention exhibits a great amount of stability when under automatic gyroscopic control and it is believed evident that were piloted control utilized, a highly maneuverable and stabilized craft would be provided.

As previously noted, the present invention contemplates launching of the helicopter from the ground in a rocket and for a detailed discussion of the construction and operation of this embodiment of the invention, reference is now made to Figures 5–9 and 11.

In particular, Figure 5 shows a rocket having a body portion 200, tail 202 and vanes 204. The warhead of the usual rocket is replaced by a special head 206 containing electronic equipment and power supplies. The power plant for the rocket is conventional and comprises the liquid oxygen and alcohol tanks 208 and 210. A pair of centrifugal pumps 212, 214 are provided for pumping the oxygen and alcohol through fuel lines 216, 218 into the burners or combustion chamber 220, the exhaust escaping through nozzle 222. A turbine 224 is provided on the same shaft as each of the pumps 212, 214 for driving the same. This turbine is driven by a peroxide-permanganate system, generally indicated by the numeral 226, much in the manner of the means for driving turbine 46, previously described.

Forward in the body of the rocket is provided the launching structure for the helicopter. Thus concentrically arranged relative to the body 200 of the craft is a launching tube 228 and may be constructed in two parts as illustrated. This is a hollow cylindrical tube rigidly secured to the rocket body and extending from adjacent the front end of the body to a point more than half way back in the body, depending on the size of the helicopter. The helicopter actually is mounted in a substantially rectangular twin vertical frame 230 which is adapted to slide in grooves, or, as shown, externally mounted angled flanges 232 disposed in the proper spaced relationship around the inner periphery of the launching tube 228 (see Figure 6). The frame 230 is constructed of two identical sections 234 which are semi-box shaped members having top and bottom members 236 and projecting flanges 238 disposed along their length. When the two sections 234 are fitted together, the end flange 238 and top and bottom members 236 abut against each other and the central flanges abut against the fuselage of the helicopter to hold it more securely therein.

If desired, the mating edges of the frame may be provided with interlocks which can be opened prior to release or launching of the helicopter. In this latter regard, reference is made to Figure 9, wherein a typical interlock for use between top member 236, for example is illustrated. Two interlocking latches 240 are shown normally held in engagement by spring 242 and armature 244, of solenoid 246. When the solenoid is energized, armature 244 is retracted, thus disengaging the latches and conditioning members 236 for ready separation. Pins 248 are used to guide members 238 into the proper position. The means for controlling the energization of solenoid 246 will be described subsequently.

The head 206 is held to the body of the rocket by means shown in Figure 8. Thus the head is positioned on the rocket body by a plurality of projections 250 and sockets 252 (clearly understood by reference to the view of the head 206 in Figure 7) and removably held in such position by a number of latching arrangements. These latches consist of an armature 254 of a solenoid 256 which projects into a slot on the projecting member 250 thus holding it in place. As many such latching means may be provided depending on the amount of structural rigidity of the head relative to the body that is desired. At the proper time solenoid 256 will be energized thus retracting its armature 254 whereby the rocket head will be conditioned for release. As in regard to the control of the other timing circuits, the control of the solenoid 256 will be subsequently discussed.

The means for launching the frame carrying the helicopter out of the launching tube consists of telescopic plunger 258 best seen in Figure 7. This plunger has a retracted position seen in Figure 5 and a fully extended position shown in Figure 7. When the frame 230 is fully inserted in the launching tube 228, it yieldingly retains plunger 258 in the retracted position. A reaction chamber 260 is provided at the base of the plunger and when a high pressure is created in this chamber, the retracted plunger will be forced into extended position at a high velocity and under great pressure. Under proper timed relation, the force created by the extending plunger bearing against frame 230 will drive the frame out of the rocket, thereby launching the helicopter into space.

The high pressure is created in chamber 260 by a permanganate-peroxide system similar to that discussed in regard to turbine 46. Thus bottle 262 contain nitrogen under pressure and valve 264 controls the release of such pressure. Tanks 266 and 268 contain the permanganate and peroxide solutions and it is believed obvious from previous discussions how the system operates.

The timing and control circuits for launching and starting the helicopter will now be described. The timing mechanism of the rocket for delivering the helicopter into space could be operated in several different ways, for example, by clock movement, by a gyroscope acting by the inclination of the path of the rocket, by barometric switch, by remote control or by an all burnt condition caused by the gradual consumption of the fuel. Any one of these methods could be employed depending on which proved best in experimentation. Preferably and as shown in the present embodiment, the all burnt method appears most favorable.

Thus a pressure line 270 connects the oxygen tank 208 with the control valve 264 for nitrogen presure in bottles 262. Furthermore, the pressure line 270 connects to line 272 (Figure 8) which leads to a plurality of pressure controlled switches, as 274 in Figure 8. Switches such as 274 are used to open the various interlocks between the rocket head 206 and body 200. Only one such switch 274 is shown but it is believed obvious that as many could be provided as desired to operate off pressure line 270 in order to control in timed relation the various interlock around the rocket head.

When the pressure in the liquid oxygen tank has dropped to a predetermined minimum, relays 256 open immediately and thus condition the rocket head for separation from the rocket body. Almost simultaneously valve 264 will open releasing the pressurized nitrogen from bottles 262 to force mixture of the permanganate and peroxide in chamber 260. An explosion is thus created which forces the plunger outwardly thus launching the frame and helicopter from the tube and forcing rocket head 206 off the body as shown in Figure 7.

At the moment the frame and helicopter are ejected into space, two things must happen, namely, the helicopter must be separated from frame 230 and the power plant for the helicopter must be started so as to quickly bring the rotor up to speed.

The former is accomplished by means of a switch 276 attached to one of the top members of the frame (Figure 6). This switch is operated by means of a lever 278, normally pulled to the down position as shown after insertion of frame member 230, housing the helicopter, preparatory to launching of the rocket. As soon as switch 276 operates, power is applied from battery 282 to solenoid 246 for releasing the various latching mechanism disposed between the frame halves 234. Compression springs 235 acting on plunger 237 inserted between the frame halves force the same apart.

When the frame halves 234 separate in space as shown in Figure 7, arm 284 attached to one of the frame halves actuates switch 286 secured to the helicopter. This switch is connected in circuit with a source of power and the various devices on the helicopter which must be instantly energized. Further, the actuation of switch 286 opens valve 288 to release pressurized nitrogen from bottles 48 to force mixing of the permanganate-peroxide solutions in chamber 54 to start turbine 46 and thus the rotor of the helicopter. Furthermore, the various gyroscopic controls 92 and 94 are connected to the servo-systems which they are to control by the action of switch 286. As will be understood, the helicopter is started in a matter of seconds and thus through operation of the gyroscopic controls will right itself and continue in flight under its own control. As mentioned before, the gyroscopes themselves were pre-set before the rocket was launched and thus conditioning the helicopter to level flight regardless of the position it takes on leaving the rocket.

Any conventional means for launching the rocket may be used and one such means is shown in Figure 11. Rigidly anchored in the ground by bracers 300 is the fixed framework, generally denoted at 302. A cradle 304 for supporting and guiding the rocket 200 during its upward movement is shown within the framework 302. The cradle is also assisted and guided in its takeoff by a plurality of guide rolls, such as 306. The rocket 200 is held within the cradle by supporting arms 308 and rests at the base on fixed supports 310. Such a launching mechanism is conventional and further explanation is considered un necessary.

From the foregoing description, it will be evident that which is disclosed is a helicopter, which can be carried to high altitudes by a rocket and upon reaching a predetermined height, can be launched into space after which it will continue in flight under its own power. A jet type helicopter has been disclosed for use in this invention because it permits of a smaller and lighter helicopter and one which is less complex in its power plant; furthermore, it provides a faster helicopter and at the high altitude where the helicopter of this invention will be used, it conserves on power.

In this latter regard, it will be understood that less power is utilized at high altitudes because the usual rotor blades are replaced by spokes or tubes 26. However, if desired, blades may be incorporated into the helicopter if lower altitudes are contemplated.

It is further more understood that the present invention is not limited to the specific structure shown in the drawings but comprises any modifications coming within the scope of the appended claims.

I claim:

1. In combination in a device for high altitude observation, a rocket and means for launching said rocket into space, said rocket having a cavity therein and a detachable head closing said cavity, a frame slidable into and out of said cavity from the head end thereof, a helicopter supported within the said frame, power means for maintaining said helicopter in flight, and means for actuating said power means in response to the removal of said helicopter from said frame and the removal of said frame from said rocket.

2. The combination in a high altitude observation device of the nature described; of a rocket and means for launching said rocket into space, a cavity in said rocket, a head detachably mounted on the rocket closing one end of said cavity, a frame slidable into said cavity from the said one end thereof, a helicopter supported within said frame, means for releasing the head from said rocket and for propelling the frame from said cavity at a predetermined point in the flight of said rocket, means for releasing the helicopter from said frame after the frame has been propelled from the rocket, power means associated with the helicopter for sustaining it in flight, and means responsive to the release of the helicopter from said frame for energizing the said power means.

3. The combination in a high altitude observation device of the nature described; of a rocket and means for launching the rocket into space, a cavity in the rocket and a head detachable from the rocket closing one end of the cavity, a frame composed of separable halves slidable into and out of said cavity from the said one end, a helicopter supported within said frame, power means for propelling said frame from said cavity, means responsive to a predetermined condition occurring during the flight of said rocket for releasing the head therefrom and for actuating said power means thereby to launch said frame and helicopter from the rocket, means responsive to said launching for separating the separable halves of said frame thereby to release said helicopter into space, power-operated flight-sustaining means associated with said helicopter, and means responsive to the launching of said helicopter into space for energizing said power-operated flight-sustaining means.

4. In a high altitude observation arrangement of the nature referred to; a rocket and power means for projecting the rocket into space, a cavity in the rocket, and a head detachably closing said cavity at one end, a helicopter within the cavity and a separable supporting frame supporting and engaging the helicopter and slidably engaging the inside of said cavity, power means to eject the frame from the cavity, means responsive to the ejection of the said frame for causing it to separate thereby to release the helicopter into space, power-operated sustaining means for the helicopter, means responsive to the launching of said helicopter for energizing said flight-sustaining means, control means in the helicopter for controlling the direction of flight thereof and adapted for being pre-set prior to the launching of the rocket, and means operable for making said control means effective when the helicopter is launched.

5. In a rocket having a rocket body and a head releasably connected to said body, a launching tube within said body, an inactive aircraft releasably retained in said tube, means in said body for launching said aircraft from said rocket, means for disconnecting said head from said body substantially simultaneously with said launching, and a power plant means for said rocket, said launching and disconnecting means being controlled by said power plant means.

6. In a rocket having an elongated body and a head detachably connected thereto, means for releasing said head from said body, an elongated tube within said body and means for mounting an aircraft in said tube, means for maintaining said aircraft inactive while in said tube, means for launching said aircraft from said rocket, pressure responsive means for initiating said launching and releasing means, and means for activating said aircraft after being launched from said rocket.

References Cited in the file of this patent
UNITED STATES PATENTS

| | | |
|---|---|---|
| 847,198 | Maul | Mar. 12, 1907 |
| 1,103,503 | Goddard | July 14, 1914 |
| 1,299,217 | Pain | Apr. 1, 1919 |
| 1,365,865 | Svejda | Jan. 18, 1921 |
| 1,949,304 | Hardin | Feb. 27, 1934 |
| 2,001,529 | Dornier | May 14, 1935 |
| 2,009,296 | Mayo | July 23, 1935 |
| 2,271,224 | Goddard | Jan. 17, 1942 |
| 2,438,151 | Davis | Mar. 23, 1948 |
| 2,497,590 | Drill | Feb. 14, 1950 |
| 2,585,030 | Nosker | Feb. 12, 1952 |
| 2,653,779 | Terry | Sept. 29, 1953 |
| 2,654,320 | Schmid | Oct. 6, 1953 |
| 2,692,094 | Brown | Oct. 19, 1954 |